United States Patent

Shimizu et al.

[11] Patent Number: 5,913,633
[45] Date of Patent: Jun. 22, 1999

[54] ARRANGEMENT FOR JOINING OUTER RING AND SHAFT OF HOMOKINETIC JOINT

[75] Inventors: Osamu Shimizu, Iwata-gun; Hiroshi Nakahashi, Iwata; Nobuo Suzuki, Fukuroi, all of Japan

[73] Assignee: NTN Corporation, Osaka, Japan

[21] Appl. No.: 08/776,319

[22] PCT Filed: Jan. 16, 1996

[86] PCT No.: PCT/JP96/00103

§ 371 Date: Jan. 30, 1997

§ 102(e) Date: Jan. 30, 1997

[87] PCT Pub. No.: WO96/38680

PCT Pub. Date: Dec. 5, 1996

[30] Foreign Application Priority Data

May 31, 1995 [JP] Japan ................................. 7-134128

[51] Int. Cl.⁶ .................................................. F16B 4/00
[52] U.S. Cl. ........................ 403/282; 403/279; 403/383; 464/905
[58] Field of Search .................... 403/282, 284, 403/279, 281, 274, 57, 76, 277, 383; 464/904, 905, 906, 139, 145, 182, 146, 111; 29/505, 521, 428

[56] References Cited

U.S. PATENT DOCUMENTS

| | | | |
|---|---|---|---|
| 1,665,280 | 4/1928 | Rzeppa | 464/145 |
| 2,006,026 | 6/1935 | Midthun | 464/145 |
| 2,034,935 | 3/1936 | Anderson | 403/282 |
| 3,106,077 | 10/1963 | Sharp | 464/906 X |
| 4,025,208 | 5/1977 | Donahue | 403/284 X |
| 4,188,800 | 2/1980 | Fujita et al. | 403/274 X |
| 4,365,488 | 12/1982 | Mochida et al. | 403/57 X |
| 5,090,834 | 2/1992 | Yamamoto | 403/277 |
| 5,335,411 | 8/1994 | Muller et al. | 40/282 X |
| 5,451,185 | 9/1995 | Krude et al. | 464/145 |
| 5,579,568 | 12/1996 | Hudson et al. | 403/282 X |
| 5,607,358 | 3/1997 | Stall et al. | 403/279 X |
| 5,667,328 | 9/1997 | Hofle | 403/282 |

FOREIGN PATENT DOCUMENTS

| | | | |
|---|---|---|---|
| 331412 | 9/1989 | European Pat. Off. | 403/282 |
| 5-185147 | 7/1993 | Japan. | |
| 6-9724 | 1/1994 | Japan. | |
| 7-224851 | 8/1995 | Japan. | |

*Primary Examiner*—Harry C. Kim
*Attorney, Agent, or Firm*—Wenderoth, Lind & Ponack, L.L.P.

[57] ABSTRACT

There is provided an arrangement for mechanically and reliably joining a shell-type outer ring of a homokinetic joint and its shaft. A circular hole (4) is formed in a press formed end wall of an outer ring (1). A polygonal surface or serrated grooves are formed on the inner periphery of the hole (4). A protrusion (7) provided at one end of a shaft (5) is press-fitted in the hole (4) to join the outer ring and the shaft so that they will not rotate relative to each other. A caulking tool is used to deform protrusion (7) to form caulked portion (14) so that the outer ring (1) is prevented from moving axially relative to shaft (5).

13 Claims, 3 Drawing Sheets

ARRANGEMENT FOR JOINING OUTER RING AND SHAFT OF HOMOKINETIC JOINT

TECHNICAL FIELD

This invention relates to an arrangement for joining an outer ring of a homokinetic joint to its shaft.

BACKGROUND ART

Shell type outer ring, which can be formed by pressing, have been gaining attention because they are lightweight and can be manufactured inexsensively.

But since a shell-type outer ring is formed from a thin steel plate, it is difficult to rigidly join with a shaft. A weak joint between the outer ring and the shaft could markedly lower the performance of the homokinetic joint.

Unexamined Japanese Patent Publication 58-8831 proposes to join a shell-type outer ring to a shaft by means of bolts or by welding.

But bolting or welding reqirues a step in addition to forming an outer ring by pressing. Since such a completely different manufacturing step must to be carried out in a single manufacturing line, workability tends to be low.

Moreover, in the welding method, the strength of the outer ring tends to drop at its joint due to the influence of welding heat. Also, in situations where welding is not uniform; a high loading torque may break the joint portion between the outer ring and the shaft.

An object of this invention is to provide an arrangement for joining the outer ring of a homokinetic joint to its shaft with high reliability, not by welding, but by a simple mechanical means.

According to this invention, there is provided an arrangement for joining an outer ring to a shaft of a homokinetic joint. The arrangement is comprised of a hole formed in the outer ring to receive the shaft, the hole being formed by pressing. The hole, in turn, has a plurality of flat surfaces or grooves. One end of the shaft is then press-fitted into the hole to join the outer ring to the shaft.

Preferably, the inner surface of the hole is harder than the engaging portion at one end of the shaft.

Since the outer ring and the shaft are prevented from turning relative to each other by the flat surfaces or serrated grooves formed on the inner periphery of the hole of the outer ring in which the shaft is press-fitted, the outer ring and the shaft can be coupled together with high reliability.

Since the surface of the hole formed in the outer ring is harder than the portion of the shaft inserted into the hole, the shaft can be held stably in position once it is press-fitted in the hole, with the portion of the shaft fitted in the hole deformed so as to conform to the shape of the hole.

DETAILED DESCRIPTION OF THE INVENTION

The embodiments of this invention will now be described with reference to the drawings.

Figure 1A:
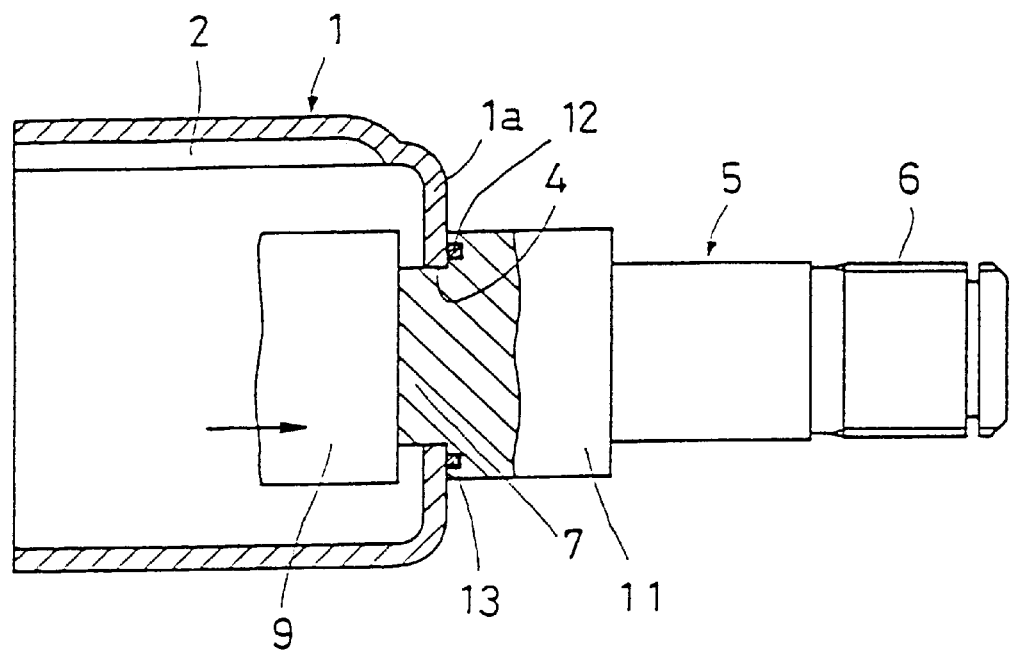
FIG. 1A is a sectional view of a first embodiment of the invention showing an outer ring being joined to a shaft.
Figure 1B:
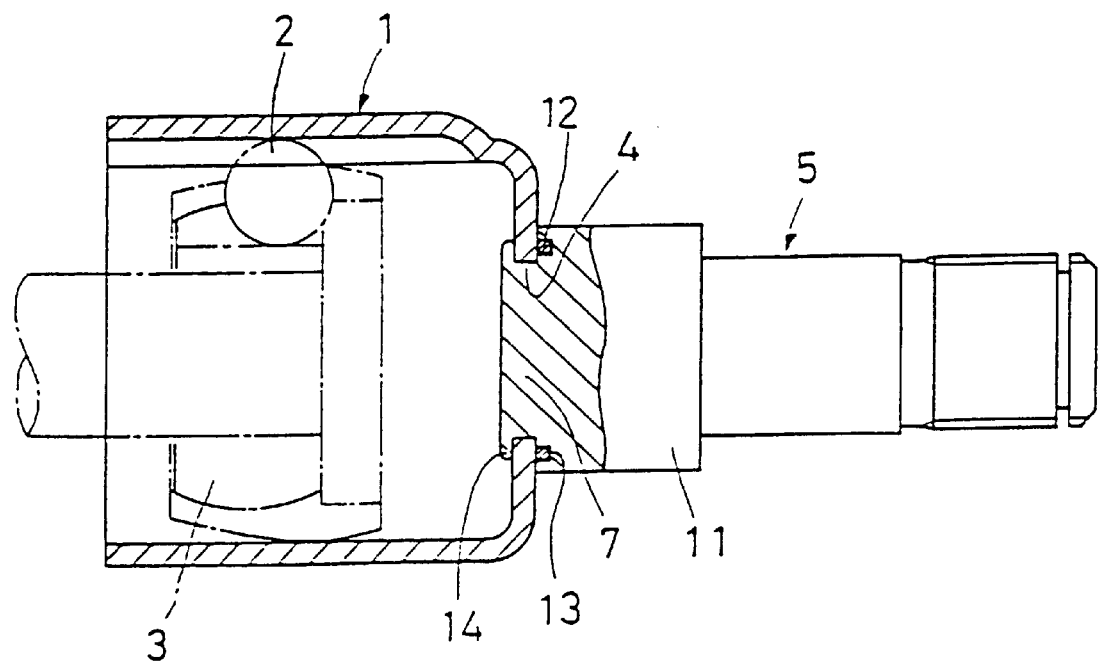
FIG. 1B is a sectional view of the outer ring and shaft of FIG. 1A after joining.
Figure 2A:
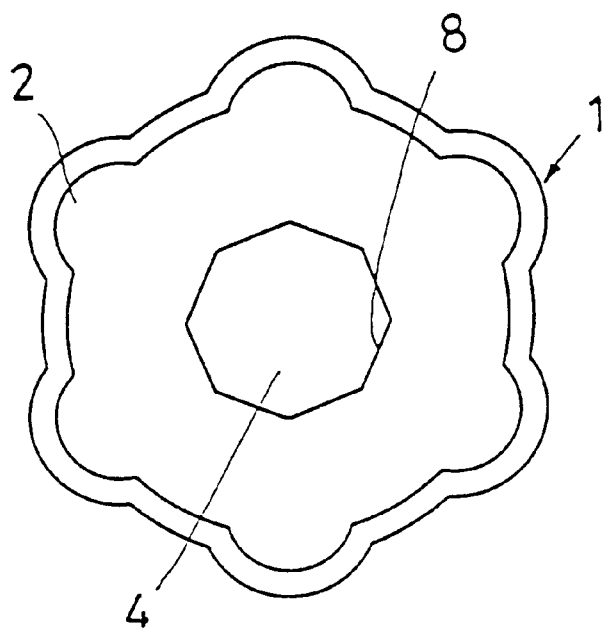
FIG. 2A is a front view of the outer ring of the first embodiment.
Figure 2B:
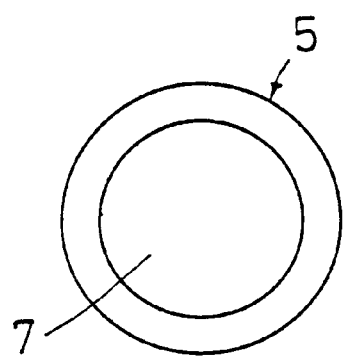
FIG. 2B is a front view of the end of the shaft.

As shown in FIGS. 1 and 2, an outer ring 1 is a cup-shaped member formed by pressing a thin-walled steel pipe or a cylindrical material having a closed bottom. A plurality of track grooves 2 are formed in the inner periphery of the outer ring 1 so that the outer ring has a petal-shaped cross-section. A homokinetic joint is assembled by mounting a torque transmission member 3 comprising balls, a cage and an inner ring in the outer ring 1. The outer ring 1 has a hole 4 formed in the center of its end wall la by punching.

Figure 3A:
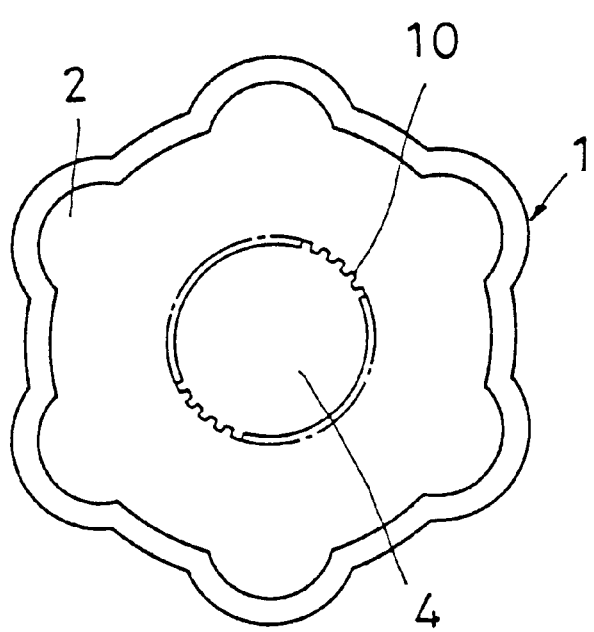
FIG. 3A is a front view of an outer ring of a second embodiment.

The hole 4 has a polygonal surface 8 as shown in FIG. 2A or a serrated surface 10 as shown in FIG. 3A. The surface 8 or 10 is hardened by carburizing or induction hardening.

A shaft 5 has a large-diameter portion 11 at one end and a protrusion 7 formed at the end of the large-diameter portion 11 and with the protression 7 being inserted into the hole 4 of the outer ring 1. Threads 6 are formed on the outer periphery of the shaft 5 at the other end thereof.

The surface of the protrusion 7 is not hardened. Its diameter is slightly larger than that of the hole 4. A seal 12 is fitted in a groove 13 formed in a shoulder between the protrusion 7 and the large-diameter portion 11.

The shaft 5 is joined to the outer ring 1 by press-fitting the protrusion 7 of the shaft 5 into the hole 4 of the outer ring 1 as shown in FIG. 1A, and striking the end of the protrusion 7 protruding into the outer ring 1 in the axial direction with a caulking tool 9 to form a caulked portion 14 at the end of the shaft 5, as shown in FIG. 1B.

By press-fitting and caulking, the polygonal shape of the surface 8 and the serration of the surface 10 are transferred to the projection 7, so that the outer ring 1 is prevented from rotating. By caulking, the shaft 5 is joined to the outer ring 1 without any axial play therebetween. The outer ring 1 will rotate together with the shaft 5. Caulking the end of the projection 7 has an additional effect of correcting any deformation of the end wall la of the outer ring 1 that may occur upon press-fitting the shaft 5 into the hole 4.

Figure 3B:
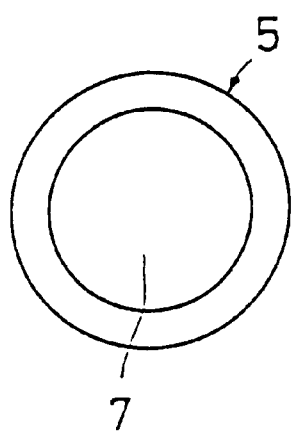
FIG. 3B is a front view of the end of the shaft of FIG. 3A.
Figure 4A:
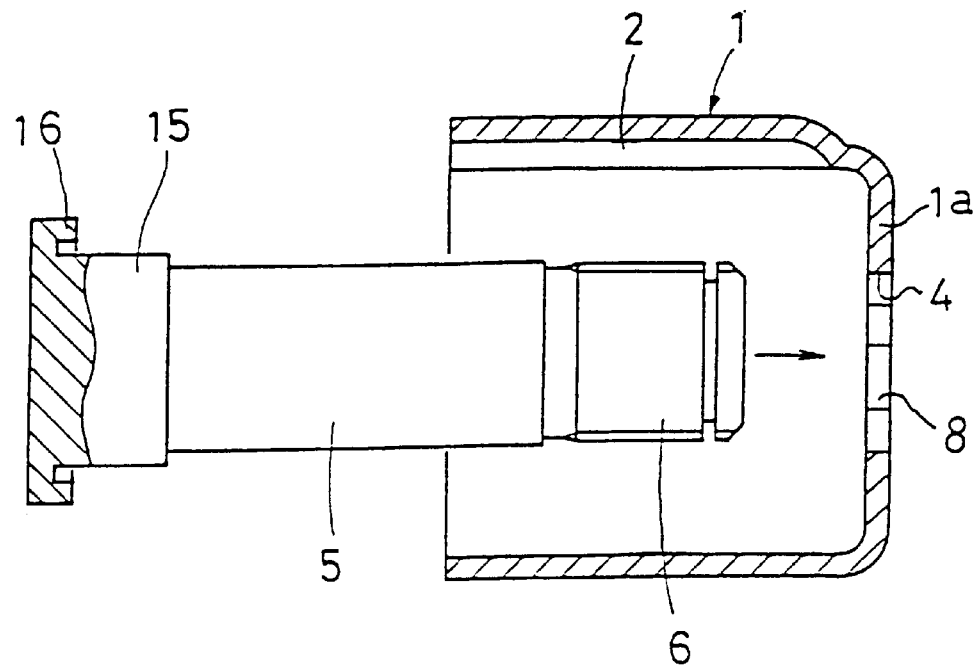
FIG. 4A is a sectional view of a third embodiment of the invention showing an outer ring being joined to a shaft.
Figure 4B:
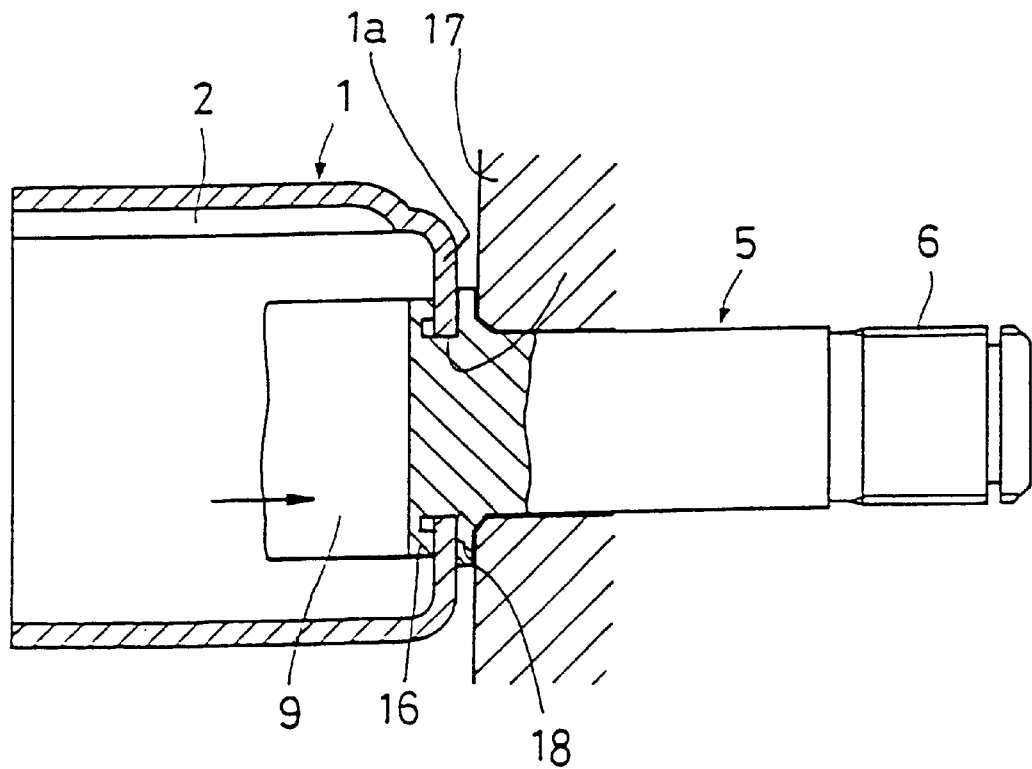
FIG. 4B is a sectional view of the outer ring and shaft of FIG. 4A after joining.

FIGS. 4A and 4B show the second embodiment, in which a shaft 5, including a threaded portion 6 at one end thereof, is slightly smaller in diameter than the hole 4 of the outer ring 1, except that an engaging portion 15 at the other end of the shaft 5, is slightly larger in diameter than the hole 4. The engaging portion 15 is provided with a flange 16 at its extreme end that prevents separation of the shaft and the outer ring. The hole 4 of the outer ring 1 has a polygonal surface 8 or serrated surface 10 similar to those shown in FIGS. 2 and 3 and is subjected to hardening.

The shaft 5 is inserted into the hole 4 from inside the outer ring 1 as shown by the arrow in FIG. 4A, until the engaging portion 15 abuts a die 17. In this state, the shaft 5 is struck with a caulking tool 9 as shown in FIG. 4B to form a caulked portion 18 thereby constituting a flange member. The portion of the engaging portion 15 fitted in the hole 4 is deformed into the polygonal or serrated shape conforming to the shape of the polygonal surface 8 or serrated surface 10.

Industrial Application

According to this invention, as fully described above, the outer ring and the shaft are mechanically joined together by pressing. Thus, the manufacturing steps of press-forming the outer ring and joining the outer ring to the shaft can be carried out continuously, so that homokinetic joints can be manufactured with high efficiency.

Since the outer ring and the shaft are prevented from rotating relative to each other by the flat surfaces or serrated grooves formed on the inner periphery of the hole of the outer ring in which the shaft is press-fitted, the outer ring and the shaft can be coupled together with high reliability. The homokinetic joint thus formed will operate stably.

Since the surface of the hole formed in the outer ring is harder than the portion of the shaft inserted into the hole, the shaft can be held stably in position once it is press-fitted and deformed into the shape of the hole. The outer ring and the shaft can thus be strongly joined.

We claim:

1. A homokinetic joint arrangement comprising:

an outer ring having a hole, said hole having a noncircular inner peripheral surface;

a shaft having a solid protrusion at one end-thereof;

wherein said protrusion is sized such that the diameter of an imaginary circle inscribed in said hole is smaller than the diameter of an imaginary circle circumscribed about said protrusion, such that said protrusion is press-fitted within said hole.

2. The homokinetic joint arrangement of claim 1, wherein said noncircular inner peripheral surface is formed with a plurality of flat faces.

3. The homokinetic joint arrangement of claim 1, wherein said noncircular inner peripheral surface is formed with a plurality of grooves.

4. The homokinetic joint arrangement of claim 1, wherein said noncircular inner peripheral surface is harder than said protrusion.

5. The homokinetic joint arrangement of claim 1, wherein said shaft further comprises a large diameter portion having a diameter greater than the diameter of said protrusion, said shaft further having a flange portion having a diameter greater than the diameter of said protrusion, whereby said outer ring is sandwiched between said large diameter portion and said flange portion.

6. The homokinetic joint arrangement of claim 1, wherein said outer ring is cup-shaped.

7. A homokinetic joint arrangement comprising:

an outer ring having a hole, said hole having a noncircular inner peripheral surface formed with a plurality of flat faces;

a shaft having a protrusion at one end thereof, said protrusion having a flange portion with a diameter greater then the diameter of said protrusion, said shaft also having a large diameter portion having a diameter greater than the diameter of said protrusion;

wherein said protrusion is sized such that the diameter of an imaginary circle inscribed in said hole is smaller than the diameter of an imaginary circle circumscribed about said protrusion, so that said protrusion is press-fitted within said hole, and that said outer ring is sandwiched between said large diameter portion and said flange portion.

8. The homokinetic joint arrangement of claim 7, wherein said noncircular inner peripheral surface is formed with a plurality of grooves.

9. The homokinetic joint arrangement of claim 7, wherein said noncircular inner peripheral surface is harder than said protrusion.

10. The homokinetic joint arrangement of claim 7, wherein said outer ring is cup-shaped.

11. A homokinetic joint arrangement comprising:

an outer ring having a hole, said hole having a noncircular inner peripheral surface;

a shaft having a protrusion at one end thereof, said protrusion having a flange portion with a diameter greater then the diameter of said protrusion, said shaft also having a large diameter portion having a diameter greater than the diameter of said protrusion;

wherein said noncircular inner peripheral surface is harder than said protrusion; and wherein said protrusion is sized such that the diameter of an imaginary circle inscribed in said hole is smaller than the diameter of an imaginary circle circumscribed about said protrusion, so that said protrusion is press-fitted within said hole, and that said outer ring is sandwiched between said large diameter portion and said flange portion.

12. The homokinetic joint arrangement of claim 11, wherein said noncircular inner peripheral surface is formed with a plurality of grooves.

13. The homokinetic joint arrangement of claim 11, wherein said outer ring is cup-shaped.

* * * * *